United States Patent [19]

Howard

[11] Patent Number: 4,688,991
[45] Date of Patent: Aug. 25, 1987

[54] ASEPTIC PUMP

[76] Inventor: Henry H. Howard, P.O. Box 4102, Modesto, Calif. 95352

[21] Appl. No.: 807,487

[22] Filed: Dec. 10, 1985

[51] Int. Cl.$^4$ ............................................. F04D 29/08
[52] U.S. Cl. .......................... 415/170 R; 415/169 R; 277/3; 277/85
[58] Field of Search ............... 415/170 R, 170 A, 206, 415/168, 169 R, 169 A; 277/24, 3, 65, 198, 81 R, 93 R, 93 SD

[56] References Cited

U.S. PATENT DOCUMENTS

| | | | |
|---|---|---|---|
| 1,161,926 | 11/1915 | Criqui | 416/185 |
| 2,712,412 | 7/1955 | West | 230/134 |
| 3,152,808 | 10/1964 | Tankus et al. | 277/84 |
| 3,162,135 | 12/1964 | Nichols et al. | 415/206 |
| 3,169,486 | 2/1965 | Freed | 415/131 |
| 3,260,443 | 7/1966 | Garnett et al. | 415/215 |
| 3,491,696 | 1/1970 | Howard | 415/143 |
| 3,572,727 | 3/1971 | Greiner | 277/85 |
| 3,811,687 | 5/1974 | Honold et al. | 277/28 |
| 3,963,247 | 6/1976 | Nommensen | 277/16 |
| 4,095,806 | 6/1978 | Dempsey | 277/27 |
| 4,196,911 | 4/1980 | Matsushita | 277/74 |
| 4,294,453 | 10/1981 | Inouye et al. | 277/93 SD |
| 4,299,398 | 11/1981 | Wahl | 277/82 |
| 4,334,826 | 6/1982 | Connolly et al. | 416/185 |
| 4,475,736 | 10/1984 | Lesiecki | 277/3 |
| 4,511,149 | 4/1985 | Wiese | 277/3 |

FOREIGN PATENT DOCUMENTS 396543  1/1966  Switzerland ........................ 277/3

Primary Examiner—Robert E. Garrett
Assistant Examiner—John Kwon
Attorney, Agent, or Firm—Harvey B. Jacobson

[57] ABSTRACT

A centrifugal pump is provided including a first stationary seal ring mounted from the pump housing for slight axial and radial shifting relative thereto. The stationary seal ring includes inner and outer large and small diameter axially facing seal faces and the impeller of the pump supports a pair of inner and outer seal rings each supported from the impeller for limited radial and axial shifting relative thereto. The inner and outer seal rings axially oppose and are disposed in sliding contact with the inner and outer seal faces of the stationary ring. Also, the impeller of the pump and the tangential outlet thereof include structural features which greatly facilitate usage of the pump in pumping thick fluids.

6 Claims, 4 Drawing Figures 4,688,991

ASEPTIC PUMP

BACKGROUND OF THE INVENTION

1. Field of the Invention

This invention relates to a centrifugal pump of increased efficiency and specifically designed for aseptic purposes, whereby the pump may be used to pump fluent food products and other similar materials. The pump includes novel seal structure and trace fluid passages for both the stationary and rotating seal rings which are axially engaged with each other and the pump impeller is specifically designed to efficiently pump thicker fluent materials.

2. Description of Related Art

Various different forms of centrifugal pumps heretofore have been provided, but many have not been constructed for aseptic pumping of fluids nor do they include structure whereby relatively thick fluids may be pumped efficiently. Accordingly, a need exists for a centrifugal pump which may be used to pump thick liquids in an efficient and aseptic manner.

SUMMARY OF THE INVENTION

The centrifugal pump of the instant invention is constructed with axially abutting and engaging stationary and rotating seal ring structures each supported for limited axial and radial shifting through the utilization of a pair of O-ring seals which are axially spaced apart and of large and small diameter. The seal assembly comprising the seal ring structures and the O-ring seals further defines an annular trace fluid passage between each pair of O-ring seals and with the pairs of passages communicated with each other, whereby a trace fluid, such as steam, may be admitted under approximately one psi.

The pump may therefore be used as an aseptic pump and the impeller thereof is specifically designed to facilitate the pumping of thick fluent materials.

The main object of this invention is to provide a pump which may be efficiently used to pump thick fluids.

Another object of this invention is to provide a centrifugal pump including novel seal structure enabling the pump to be used as an aseptic pump.

Yet another object of this invention is to provide a pump seal structure incorporating stationary and rotating axially engaged seal ring assemblies each including a pair of axially spaced large and small dismeter supporting O-ring seals enabling the seal ring structures to shift slightly both axially and radially.

Another important object of this invention, in accordance with the immediately preceding object is to provide a seal structure forming annular pressurized trace fluid passages between each pair of O-ring seals and wherein the trace fluid passages are communicated with each other.

Still another object of this invention is to provide a centrifugal pump including an impeller designed to efficiently draw thick liquids to be pumped to the inlet of the pump.

A further object of this invention is to provide a centrifugal pump whose impeller includes outer peripheral blade portions specifically designed to facilitate the discharging of thick liquids being pumped from the impeller cavity of the pump.

A final object of this invention to be specifically enumerated herein is to provide a centrifugal pump in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
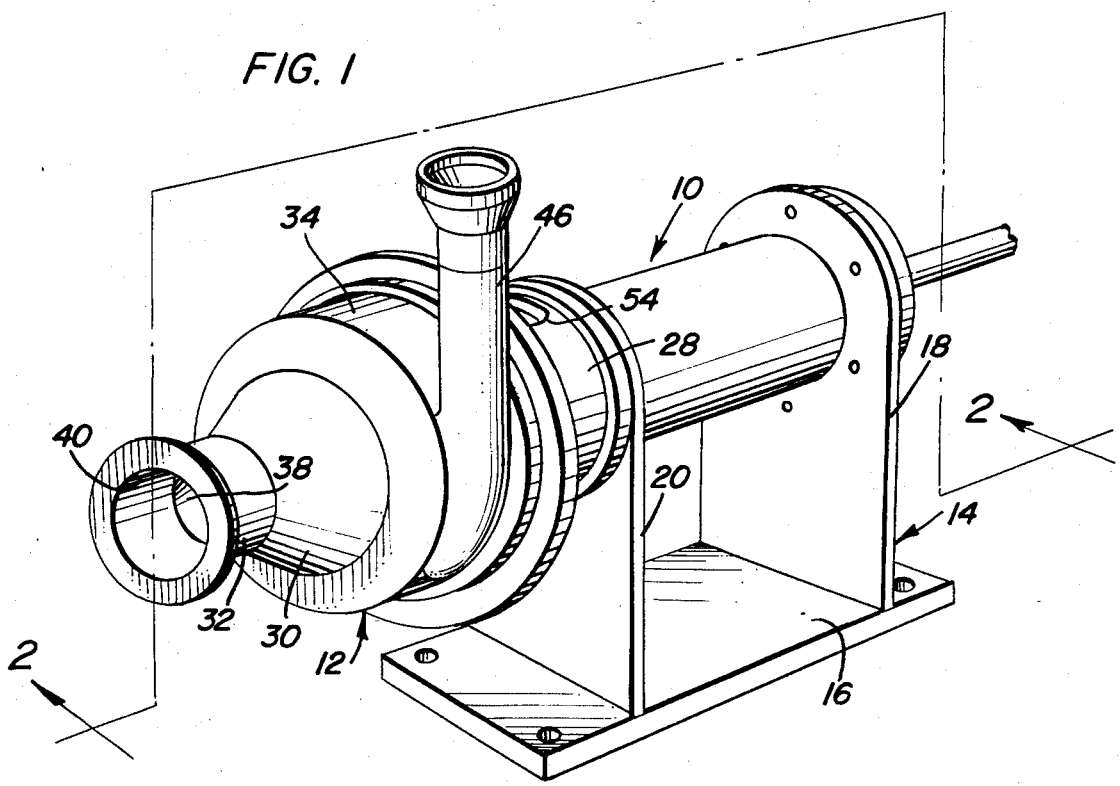
FIG. 1 is a perspective view of a centrifugal pump constructed in accordance with the present invention.

Referring now more specifically to the drawings, the numeral 10 generally designates the centriful pump of the instant invention.

The pump 10 includes a pump body referred to in general by the reference numeral 12 removably supported from a support therefor referred to in general by reference numeral 14.

The support 14 includes a base plate 16 upwardly from which a pair of parallel mounting plates 18 and 20 extend and the plates 18 and 20 mount bearings 22 and 24 therefrom by which a shaft 26 extending through the bearings 22 and 24 is journaled from the support 14. One end of the shaft 26 projects forwardly of the plate 20 and at least substantially through an adapter 28 removably carried by the front mounting plate 20.

Figure 2:
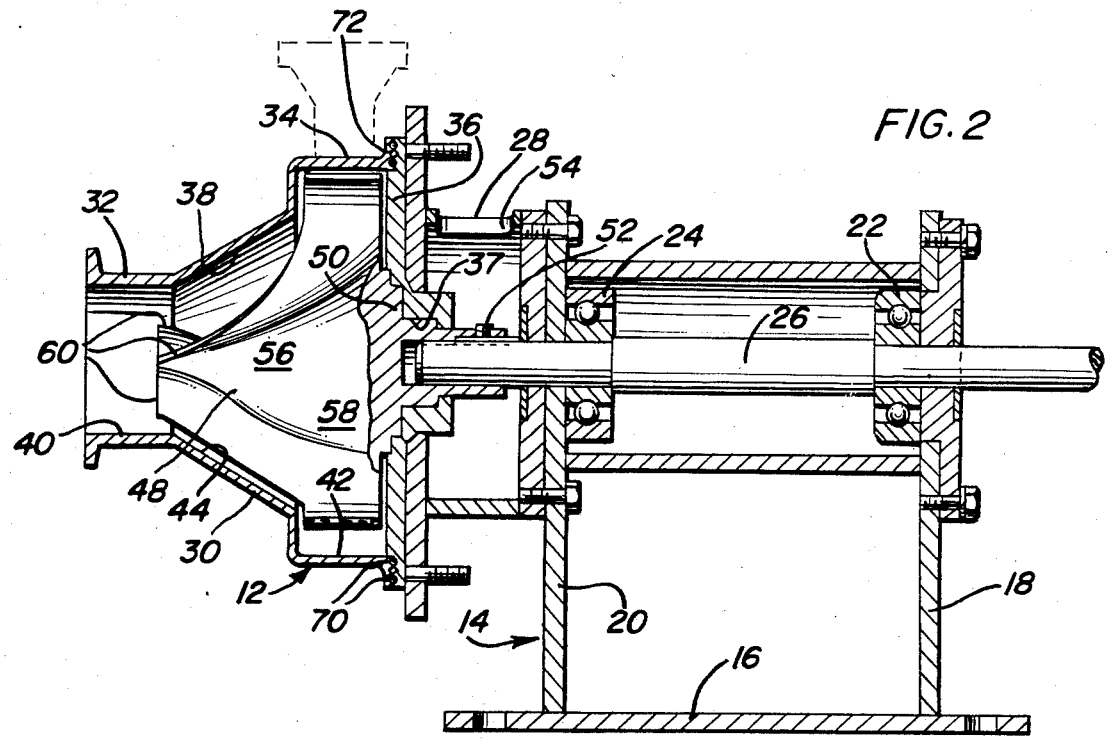
FIG. 2 a longitudinal vertical sectional view taken substantially upon the plane indicated by the section line 2—2 of FIG. 1.

The body 12 includes a main housing 30, see FIG. 2, including a front inlet end 32 and a rear end 34 closed by a rear wall 36 secured thereover and having a central multi-counterbore equipped opening 37 formed therein.

The housing 30 defines an internal impeller cavity 38 which is substantially circular in cross-sectional shape and includes front and rear small and large diameter axial end portions 40 and 42 and a tapering intermediate length cavity portion 44 extending between and communicating the end portions 40 and 42. The tapering intermediate length cavity portion 44 includes a small diameter end opening into and being generally the same diameter as the front axial end portion 40 and a large diameter end opening into and being somewhat smaller in diameter than the rear axial end portion 42 of the cavity 38. Although the cavity 38 is substantially circular in cross-sectional shape, a generally tangential outlet 46 opens outwardly of the rear axial end portion 42 of the cavity 38.

A multi-bladed impeller 48 includes a stepped rear end portion 50 received within the opening 36 and mounted on the forward end of the shaft 26. The impeller 48 is secured to the shaft 26 by a set screw 52 to which access may be had through an opening 54 formed in the adapter 28.

The impeller 48 includes first and second axial ends 56 and 58 disposed in the intermediate length cavity portion 44 and the rear axial end portion 42 of the cavity 38. The impeller 48 see FIG. 4, includes three blades 60 equally spaced thereabout and including rear major dimensional portions 64 supported from the rear end 58 and which extend generally radially of the center axis of the impeller 48. The blades of the impeller include forward ends 62 which taper in radial extent substantially throughout the first or forward axial end 56 of the impeller 48. The rear end major dimension portions 64 are disposed within the rear axial end portion 42 of the cavity 38 and extend generally radially of the axis of rotation of the impeller 48. The radial outermost ends of the rear ends of 64 of the blades 60 curve rearwardly as at 66 relative to the direction of intended rotation of the impeller 48, the curved portions 66 being adapted to push a thick liquid being pumped by the pump 10 outwardly through the tangential outlet 46. The forward ends of 62 of the blades 60 are twisted slightly in the direction of intended rotation of the impeller 48 and terminate forwardly in forward terminal ends 68.

Figure 4:
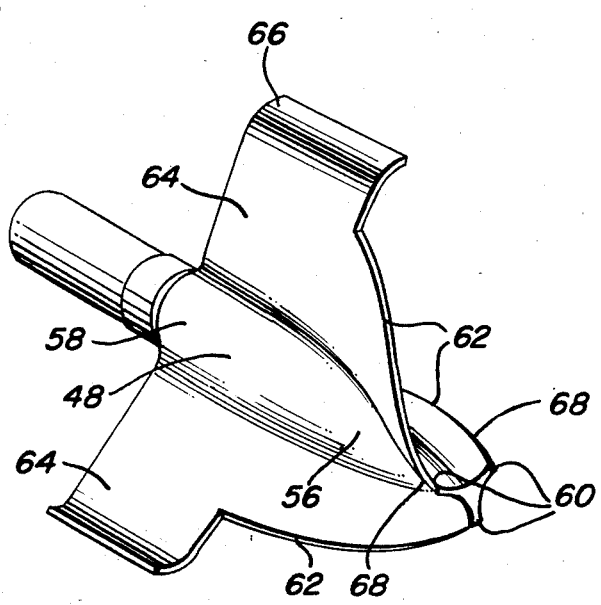
FIG. 4 is a perspective view of the impeller of the pump.

From FIG. 4 of the drawings, it may be seen that the impeller 48 is designed to be rotated in a counterclockwise direction as viewed in FIG. 4 and that the curved portions 66 will tend to push a thick fluid being pumped by the pump 10 outwardly of the tangential outlet 46 as opposed to "throwing" such a thick liquid toward the tangential outlet 46. In addition, the forward ends 62 of the blades 60 tend to draw a thick fluid being pumped into the inlet of the pump 10 defined by the small diameter front axial end portion 40 of the cavity 38.

The end wall 36 and housing 30 coact to form a pair of O-ring equipped annular seal areas 70 between the housing 30 and the end wall 36 as well as an annular trace fluid passage 72 disposed between the annular seal areas 70.

Figure 3:
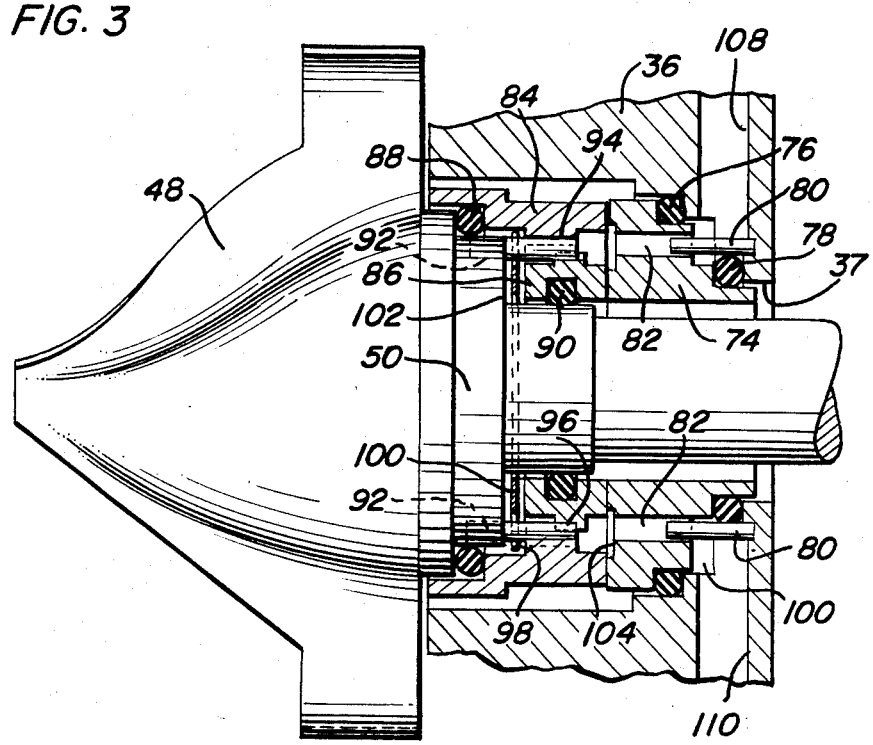
FIG. 3 is an enlarged fragmentary longitudinal vertical sectional view illustrating the seal structure by which the rotatable impeller is sealed relative to the the housing portion of the pump and double communicated trace fluid passages are provided.

With attention new invited more specifically to FIG. 3 of the drawings, it may be seen that the end wall 36, defining the multi-counterbore equipped opening 37 therethrough, includes a stepped stationary seal ring 74 disposed therein and mounted in position within the opening 37 through the utilization of a pair of axially spaced large and small diameter O-rings 76 and 78. The stationary seal ring 74 is keyed to the rear end wall 36 through the utilization of a pair of rear wall supported pins 80 loosely slidably received within front to rear extending bores 82 formed in the stationary seal ring 74.

The rear end 50 of the impeller 48 is stepped and supports inner and outer rotating seal rings 84 and 86 therefrom through the utilization of large and small diameter axially spaced O-rings 88 and 90. The impeller 48 includes pins 92 corresponding to the pins 80 and which are received in generally semi-cylindrical recesses 94 and 96 formed in the inner and outer peripheries of the seal rings 84 and 86. In addition, the seal rings 84 and 86 are backed by wave springs 98 and 100 tending to yieldingly bias the rings 84 and 86 into axial abutting engagement with the outer and inner peripheral portions of the opposing axial end of the seal ring 74. Accordingly, a fluid tight seal is formed between the juxtaposed and contacting axial faces of the seal ring 74 and the seal rings 84, 86, the seal ring 74 being stationary with respect to the end wall 36 and the seal rings 84 and 86 being rotatable, with the impeller 48, relative to the end wall 36.

The opposing portions of the end wall 36 and the seal ring 74 define an annular trace fluid passage 100 between the seals defined by the O-rings 76 and 78 and a similar trace fluid passage 102 is defined between the stepped rear end 50 of the impeller 48 and the seal rings 84 and 86, the passage 100 being communicated with a central groove 104 formed in the seal face of the seal ring 74 through the bores 82 and the passage 102 being communicated with the groove 104 through the semi-cylindrical recesses 94 and 96 in which the pins 92 are loosely received. Also, the end wall 36 includes trace fluid bores 108 and 110 which open into the passage 100 and through which a trace fluid under approximately one psi may be circulated.

The bores 108 and 110 may be coamunicated with a suitable source (not shown) of trace fluid under pressure, as may be the trace fluid passage 72. Further, because of the rearward curved portions 66, the pressure differential from the forward sides of the blades 60 to rear sides thereof is greater and the suction created at the forward or inlet end of the impeller 48 is greater.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A centrifugal pump including a housing having front and rear ends and defining an impeller cavity of generally circular cross-sectional shape therein including front and rear small and large diameter axial end portions and a tapering intermediate length cavity portion extending between and communicating said end portions, said tapering intermediate length cavity portion including a small diameter end opening into and being generally the same diameter as said front axial end portion and a large diameter end opening into and being somewhat smaller in diameter than said rear axial end portion, said rear axial end portion including a generally tangential outlet, said front axial end portion opening through the front end of said housing and defining a fluid inlet and said rear axial end portion being closed, a multi-bladed impeller journalled in said cavity, said impeller including first and second axial ends disposed in said intermediate length cavity portion and said rear axial end portion, respectively, the blades of said impeller including forward ends tapering in radial extent substantially throughout said first axial end toward said front axial end portion, said blades each including a rear end on said second axial end of said impeller appreciably greater in radial extent than the rear extremity of the forward end of the blade and disposed in said rear axial end portion of said cavity, said impeller being designed to be rotated in a direction in which said blades move toward said outlet, the radial outermost ends of said blade rear ends being curved in a trailing direction relative to the direction of rotation of said impeller, the forward ends of said blades, throughout at least a major portion of the axial extent thereof, being twisted in the direction of rotation of said impeller, said rear axial end portion of said cavity being closed by a rear wall secured over the rear end of said housing and through which journalled shaft means extends upon which said impeller is mounted, said housing rear end and said rear end wall including opposing annular generally axial faces, large and small diameter radially spaced apart annular seals establishing fluid tight seals between said faces, said faces, between said annular seals, defining a generally annular pressurized trace fluid passage, said pump including a mount, said shaft means being journalled from said mount and including one extended end upon which said impeller is mounted, said rear end wall including a multiple counterbore equipped opening formed therethrough which said shaft means extends, a stationary seal ring including a stepped outer circumference disposed in said opening and loosely receiving said shaft means therethrough, a first pair of large and small diameter axially spaced annular seals interposed between said counterbores and said stepped outer circumference forming a pair of axially spaced fluid seal zones between said end wall and stationary seal ring, said seal ring and end wall including coacting means preventing rotation of the said stationary seal ring relative to said housing and said first and large diameter annular seal supporting said stationary seal ring from said rear end wall for limited axial and radial shifting relative thereto, said shaft means including a stepped outer circumference disposed in said opening, a pair of large and small diameter seal rings disposed about said stepped outer circumference of said shaft means, a second pair of large and small diameter axially spaced annular seals interposed between the last mentioned stepped outer circumference and said seal, rings forming a second pair of axially spaced fluid tight seal zones between said stepped outer circumference of said shaft means and said pair of seal rings and said shaft means including means keying said pair of seal rings to said shaft means for rotation therewith and said second seals supporting said seal rings from said shaft means for limited axial and radial shifting relative thereto, said stationary seal ring including inner and outer generally axially facing seal faces opposing and disposed in sliding contact with opposing generally radially and axially facing seal faces defined by said small and large diameter seal rings.

2. The pump of claim 1 including spring means interposed between said shaft means and said pair of seal rings yieldingly biasing the latter toward said stationary seal ring.

3. The pump of claim 1 including means for admitting low pressure trace fluid into the annular zones disposed between said stationary seal ring and said end wall and said first large and small diameter annular seals and between said second large and small diameter annular seals and said stepped circumference and said pair of seal rings.

4. In combination with a structure having a multiple counterbore equipped opening formed therethrough and shaft means extending through said opening, a seal structure including a stationary seal ring including a stepped outer circumference disposed in said opening and loosely receiving said shaft means therethrough, a first pair of large and small diameter axially spaced annular seals interposed between said counterbores and said stepped outer circumsference forming a pair of axially spaced fluid tight seal zones between said end wall and stationary seal ring, said seal ring and end wall including coacting means preventing rotation of said stationary seal ring relative to said housing and said first large and small diameter annular seals supporting said stationary seal ring from said rear wall for limited axial and radial shifting relative thereto, said shaft means including a stepped outer cirumference disposed in said opening, a pair of large and small diameter seal rings disposed about said stepped outer circumference of said shaft means, a second pair of large and small diameter axially spaced annular seals interposed between the last mentioned outer circumference and said pair of seal rings forming a second pair of axially spaced fluid tight seal zones between said stepped outer circumference of said shaft means and said pair of seal rings, said pair of seal rings and shaft means including means keying said pair of seal rings to said shaft means for rotation therewith and said second seals supporting said pair of seal rings from said shaft means for limited axial and radiall shifting relative there to, said stationary seal ring including inner and outer generally radially axially facing seal faces opposing and disposed in sliding contact with opposing generally radial and axially facing seal faces defined by said small and large diameter seal rings.

5. The seal structure of claim 4 including spring means interposed between said shaft means and said pair of seal rings yieldingly biasing the latter toward said stationary seal ring.

6. The seal structure of claim 4 including means for admitting low pressure trace fluid into the annular zones disposed between said stationary seal ring and said end wall and said first large and small diameter annular seals and between said second large and small diameter annular seals and said stepped circumference and said pair of seal rings.

* * * * *